Feb. 11, 1930.  H. A. HOUSE, JR  1,746,476
WHEEL
Original Filed April 1, 1927  3 Sheets-Sheet 2

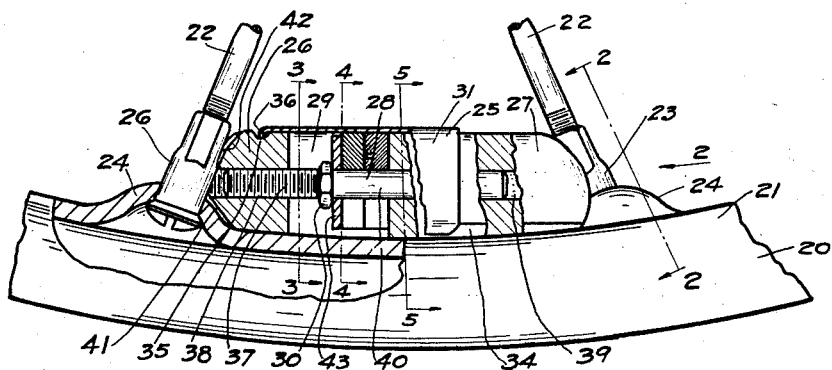
FIG. 1.
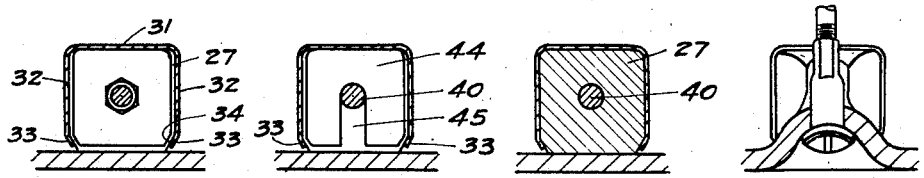
FIG. 3.　　FIG. 4.　　FIG. 5.　　FIG. 2.
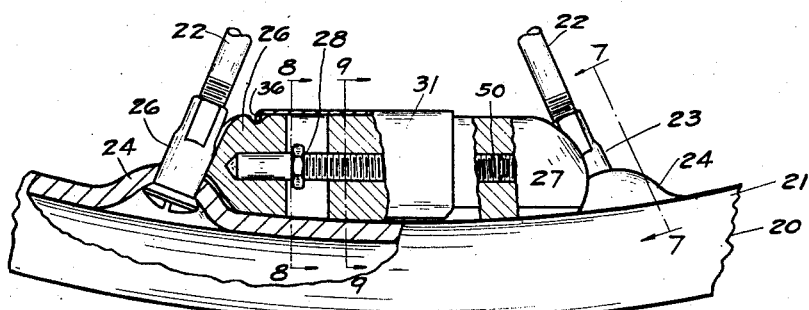
FIG. 6.
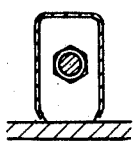　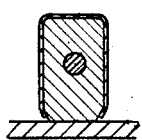　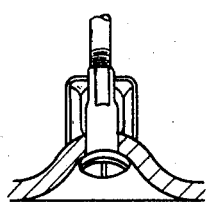
FIG. 8.　　FIG. 9.　　FIG. 7.
Inventor
HENRY A. HOUSE JR.

Inventor
HENRY A. HOUSE JR
By Clarence S. Walker
Attorney

Feb. 11, 1930. H. A. HOUSE, JR 1,746,476
WHEEL
Original Filed April 1, 1927  3 Sheets-Sheet 3

Inventor
HENRY A. HOUSE JR.

By Clarence S Walker
Attorney

Patented Feb. 11, 1930

1,746,476

UNITED STATES PATENT OFFICE

HENRY A. HOUSE, JR., OF BUFFALO, NEW YORK

WHEEL

Refile of application Serial No. 180,127, filed April 1, 1927. This application filed February 24, 1928.
Serial No. 256,762.

This invention relates to an improvement in wheels and more particularly to an improvement in balancers adapted to be used for the purpose of holding the wheel in proper balance at all times.

It has been found that in many cases a wheel which is in proper balance at the time it was made and before the tire is mounted thereon is thrown out of balance by the addition of the tire and that true operation of the wheel is impaired.

The primary object of this invention is to correct this condition by means of balancers which can be expanded to clamp them against the rim.

Another object of this invention is to provide a balancer which includes a pair of blocks adapted to be mounted on the under surface of the rim and expanded into contact with an adjacent pair of spokes.

A further object of this invention is to provide a balancer having a three point contact with the walls of an inner rim of a wheel having two rims.

Other objects will appear from a consideration of the following specification taken in connection with the drawings which form a part thereof, and in which:

Figure 1 is a side elevation, with parts broken away, of one embodiment of this invention;

Figure 2 is a sectional view taken along the line 2—2 of Figure 1;

Figure 10:
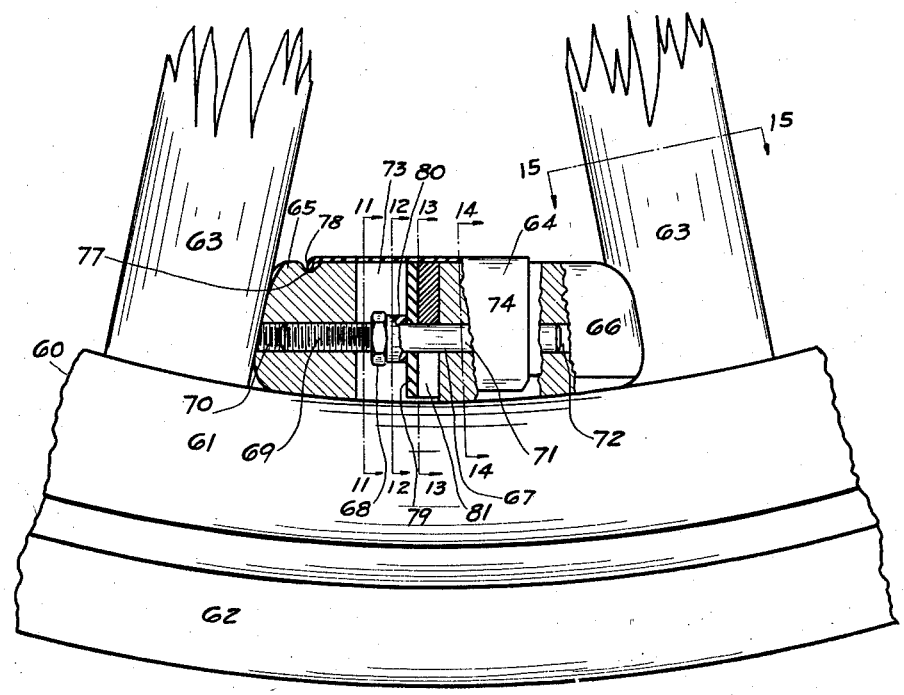
Figure 11:
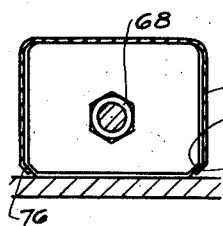
Figure 12:
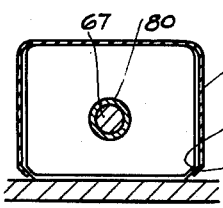
Figure 16:
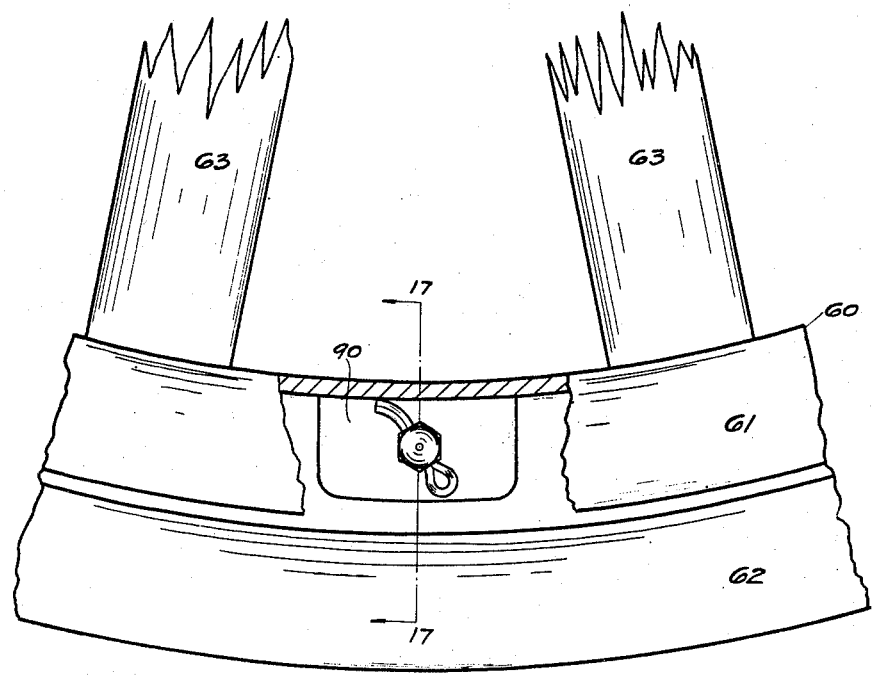

Figures 3, 4 and 5 are cross sectional views taken along the lines 3—3, 4—4 and 5—5 of Figure 1;

Figure 6 is a side elevation, with parts broken away, of another embodiment of this invention;

Figure 7 is a sectional view taken along the line 7—7 of Figure 6;

Figures 8 and 9 are cross sections taken along the lines 8—8 and 9—9 of Figure 6;

Figure 10 is a side elevation of another embodiment of this invention particularly intended to be applied to wheels having wood spokes;

Figures 11, 12, 13, 14 and 15 are cross sections taken as indicated by the section lines and arrows on Figure 10;

Figure 16 is a side elevation, certain parts being broken away, of yet another embodiment of this invention adapted to be secured to the inner rim of a wheel having an inner and an outer rim;

Figure 17:
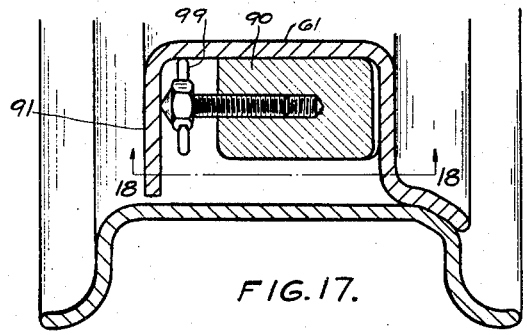

Figure 17 is a cross section taken along the line 17—17 of Figure 16; and

Figure 18:
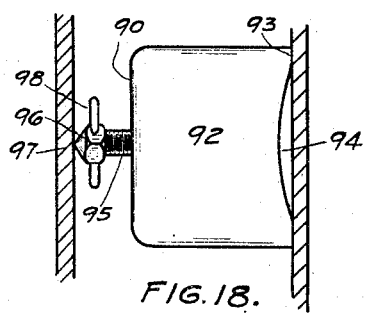

Figure 18 is a bottom plan and section view taken along the line 18—18 of Figure 17.

In the drawings, the reference character 20 is employed to designate a wheel of the wire spoke type having a rim 21, and inclined spokes 22 threaded into nipples 23 seated within cups 24 formed in the base of the rim. A balancer 25, embodying this invention, is intended to be mounted against the surface of the rim between an adjacent pair of spokes and held in that position by the engagement of the ends of the balancer with the nipple 23 or spokes 22.

The balancer 25 comprises briefly a pair of end blocks 26, 27, a bolt 28 which engages both said blocks and by which the position of the blocks 26, 27 with relation to each other is fixed. There is provided between the blocks 26, 27 a space 29 in which a collar 30 fixed on the bolt 28 is located. In order to enclose the space 29 and to connect the blocks 26, 27 a shell 31 is provided which is substantially rectangular in conformation and open at one side. The walls 32 of the shell are each provided with an inwardly turned flange 33 as shown particularly in the sectional views 3, 4, 5, 8 and 9. The edges of the blocks 26, 27 adjacent the rim are chamfered at 34 so that when the shell 31 is set in place the flanges 33 engage the chamfered portions of the blocks. As a further means for positioning the shell 31 on the blocks a transverse groove 35 is provided in the block 26 and one end of the shell is provided with a flange 36 which enters the groove 35 and thus secures the shell in its position.

The bolt 28 is preferably threaded at one end only, its threaded end 37 being, as shown in Fig. 1, in threaded engagement with a tapped hole 38 in the block 26. The hole 39 in the block 27 is unthreaded and the end 40 of the bolt is free to move longitudinally therein. Obviously by turning the collar 30, the blocks 26, 27 may be separated or brought together according to the direction in which the bolt is turned.

The ends of each block 26, 27 are provided with a depression 41 which receives the outer surface of the cup 24 and with a depression 42 which receives the nipple 23. The angularity of the spokes to the rim vary for a number of reasons as, for example, due to the number or to the length of the spokes. In order to allow for this variance and permit the use of the same balancer 25 upon different wheels, the depressions 42 are curved so that they will engage the spokes regardless of their angularity.

In the embodiment shown in Fig. 1 the bolt 28 is provided with a rectangular plate 43 on the unthreaded portion 40 of the bolt between the collar 30 and the block 27. In addition to the plate 43 there is also provided a plurality of weights 44, each weight having a slot 45 therein by means of which the weight can be slipped upon the bolt 28 between the plate 43 and the block 27.

The embodiment shown in Figs. 6, 7, 8, and 9 is similar to that previously described but differs therefrom in certain details of construction. In this embodiment the bolt 28 is in threaded engagement with a tapped hole 50 in the block 27 and is free to move in an unthreaded hole in the block 26. No weights 44 are provided and the plate 43 is also omitted. In other respects the construction is the same.

The embodiment disclosed in Figs. 10 to 15 inclusive is particularly adapted to be applied to a wheel having wooden spokes. The wheel here designated as 60 includes an inner rim 61, an outer rim 62, and spokes 63. The balancer 64 is secured against the under surface of the rim 61 by means of the engagement of blocks 65, 66 with the adjacent pair of spokes 63. The blocks 65, 66 are fixed in the desired position by means of a bolt 67 which is provided with a collar 68 to facilitate its operation. The bolt 67 has a threaded portion 69 which engages a tapped hole 70 in the block 65 and also has an unthreaded portion 71 which moves freely longitudnally in a hole 72 in the block 66.

Figure 13:
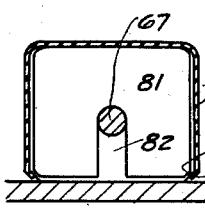
Figure 14:
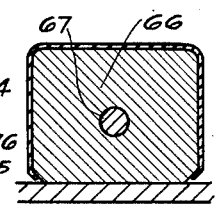
Figure 15:
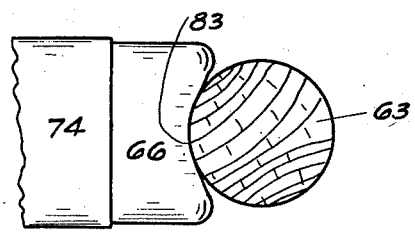

The space 73 between the blocks 65, 55 in which space the collar 68 is located, is enclosed by means of a shell 74 rectangular in cross section and having one side open which side is defined by inturned flanges 75. The edges 76 of the blocks 65, 66 adjacent the rim are chamfered and engaged by the flanges 75, thus holding the shell 74 in place. In the inner face of the block 65 is provided a transverse groove 77, which is engaged by a flange 78 formed at one end of the shell 74. Mounted on the bolt 67 is a plate 79, a sleeve 80 located between the plate 79 and the collar 68, and a weight 81 located between the plate 79 and block 66. The weight 81, as shown in Fig. 13, is provided with a slot 82 to facilitate its application to or removal from the bolt 67. The outer ends of the blocks 65, 66 are provided with depressions 83 within which the spokes 63 are received as is shown particularly in Fig. 15.

After being equipped with tires the wheels are tested for balance and the heavier points of the wheel and tire are determined. Balancers are then installed to increase the weight of the lighter portions of the wheel. The shells of the balancers to be used are removed and the bolts turned to bring the blocks near each other so that the balancer can be inserted between the selected pair of spokes. The bolt is now turned to separate the blocks and force them into engagement with the spokes. This is preferably done with an open ended wrench and the blocks are forced apart until the balancer is securely clamped in position against the surface of the rim. Due to the angularity of the spokes the tendency of the balancer, as the bolt is tightened, is to slide down against the rim surface. The shell is now snapped into place, the side flanges engaging the chamfered edges of the blocks and the end flange engaging the notch in one of the blocks. No further attention need be given the balancer unless there be a shift in the location of the heavy points of the wheel due probably to the replacement of the original tire by a spare. When this takes place, the balancers may be removed and the wheel rebalanced.

When the variance in weight of the wheel points is great, weights may be used to increase the effectiveness of the balancer. Such weights are hung upon the bolt before the blocks are clamped in place and will be covered by the shell. If the variance is only slight the form of balancer shown in Fig. 6 may be employed.

The balancers, thus previously described, are adapted to be secured against the under surface of the wheel rim between a pair of adjacent spokes. The embodiment shown in Figs. 16, 17 and 18 is intended to be mounted within the inner rim and is shown applied to a wheel 60 of the type set forth in Fig. 10 having an inner rim 61, an outer rim 62, and spokes 63, suitably secured to the underface of the inner rim. A balancer 90 is provided which is seated within the inner rim 61 being clamped against the base thereof by its engagement with the walls 91 of the rim 61. The balancer 90 includes a block 92, two opposite side edges 93 of which are separated from each other by a recess 94. Threaded into the block 92 is a bolt terminating in a head 96 having pointed tip or apex 97. The head 96 may be hexagonal in conformation, as is shown in the drawing, or may be of any desired form, preferably irregular in the shape so that the head may be engaged by a wrench. By turning the bolt 95 in the proper direction the head 96 is moved from the block 92 until the apex 97 engages one wall 91 of the rim while the edges 93 engage the other wall. As will be clear from an examination of the drawings, these three points of engagement are triangularly arranged and, consequently, when the balancer 90 has been set in the desired position, it will have no tendency to shift therefrom. In order to hold the bolt in the desired position and to prevent any involuntary loosening a cotter pin 98 may be passed through a hole 99 in the head 96. One end of the cotter pin 98 will bear against the base of the rim as shown particularly in Figs. 16 and 17 and thus prevent any loosening of the bolt.

While certain embodiments of this invention have been shown and described, applicant is not to be limited thereto since it is obvious that other embodiments can be made without departing from the spirit and scope of this invention as set forth in the following claims.

I claim:

1. A balancer for a spoked wheel adapted to bear against the under face of the wheel rim between two adjacent spokes, comprising a pair of blocks, each block having a hole therein, the hole in one of said blocks being tapped, the outer surface of one of said blocks having a transverse groove therein, the edges of said blocks adjacent said rim being chamfered, and the ends of said blocks having depressions therein which receive said spokes, a bolt carried by said blocks and resting in the holes therein, one end of said bolt being threaded to mesh with said threaded hole, a plate carried by said bolt, a slotted weight being on said bolt between said plate and one of said blocks, a collar fixed on said bolt between said plate and the other of said blocks by which said bolt can be rotated in the threaded hole to fix the distance between said blocks and a rectangular shell open at one side, the edges adjacent said open side being flanged to engage the chamfered edges of said blocks and one end of said shell having a flange which enters the groove, said shell bearing upon both said blocks and spanning the space between them.

2. A balancer for a spoked wheel adapted to bear against the under face of the wheel rim and against two adjacent spokes, including a pair of blocks the ends of which have recesses therein to receive said spokes and means for holding said blocks against the rim of said wheel and against said spokes.

3. A balancer for a spoked wheel adapted to bear against the under face of the wheel rim and against two adjacent spokes, including a pair of blocks, the ends of which have recesses therein to receive said spokes and a shell bearing upon both said blocks and spanning the space therebetween.

4. A balancer for a spoked wheel adapted to bear against the under face of the wheel rim and against two adjacent spokes, including a pair of blocks, the ends of which have recesses therein to receive said spokes, a shell bearing upon both said blocks and spanning the space therebetween and means for removably securing said shell in position.

Signed by me at Buffalo, New York, this twentieth day of February, 1928.

HENRY A. HOUSE, JR.